(12) United States Patent
Boland

(10) Patent No.: US 8,522,393 B2  
(45) Date of Patent: Sep. 3, 2013

(54) WINDSHIELD WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1114 days.

(21) Appl. No.: 11/814,022

(22) PCT Filed: Jan. 10, 2006

(86) PCT No.: PCT/EP2006/050119  
§ 371 (c)(1),  
(2), (4) Date: Mar. 5, 2010

(87) PCT Pub. No.: WO2006/074995  
PCT Pub. Date: Jul. 20, 2006

(65) Prior Publication Data  
US 2010/0154158 A1    Jun. 24, 2010

(30) Foreign Application Priority Data

Jan. 14, 2005 (EP) ..................................... 05100210

(51) Int. Cl.  
*B60S 1/40* (2006.01)  
*B60S 1/34* (2006.01)

(52) U.S. Cl.  
USPC ................................. 15/250.32; 15/250.351

(58) Field of Classification Search  
USPC ............. 15/250.32, 250.201, 250.43, 250.44, 15/250.361, 250.351  
See application file for complete search history.

(56) References Cited

U.S. PATENT DOCUMENTS

| | | | | |
|---|---|---|---|---|
| 3,023,446 A | * | 3/1962 | Prohaska | 15/250.32 |
| 3,080,463 A | * | 3/1963 | Kozacka | 337/160 |
| 3,372,422 A | * | 3/1968 | Anderson | 15/250.453 |
| 2006/0248675 A1 | * | 11/2006 | Vacher et al. | 15/250.32 |

FOREIGN PATENT DOCUMENTS

| EP | 1403156 A1 | | 3/2004 |
|---|---|---|---|
| WO | WO 2004/024520 A1 | | 3/2004 |
| WO | WO2010031640 | * | 3/2010 |

* cited by examiner

*Primary Examiner* — Gary Graham  
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein the oscillating arm is pivotally connected to the connecting device about a pivot axis near one end, with the special feature that the connecting device comprises at least two parts provided with protrusion/hole features for detachably connecting the parts together, wherein the first part is retained onto the wiper blade and wherein the second part has an at least substantially U-shaped cross-section at the location of its connection to said first part, wherein each leg of said U-shaped cross-section is allowed to bend outwardly upon insertion of the oscillating arm into said second part for connecting said first and second parts together through a snapping operation.

13 Claims, 6 Drawing Sheets

WINDSHIELD WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end.

2. Related Art

Such a windscreen wiper device is generally known. This prior art windscreen wiper device is designed as a "yokeless" wiper device, wherein no use is made of several yokes pivotally connected to each other, but wherein the wiper blade is biassed by the carrier element, as a result of which it exhibits a specific curvature.

In practice it has become apparent that, during use of the known windscreen wiper device, high forces are exerted on the connection between the connecting device and the oscillating arm. As a consequence thereof the wiper blade may get loose from the oscillating arm.

SUMMARY OF THE INVENTION

The object of the invention is to provide a windscreen wiper device, wherein the connecting device and the oscillating arm are connected in an improved manner, using a minimum of parts.

A windscreen wiper device of the type referred to in the introduction is distinguished according to the invention in that the connecting device comprises at least two parts provided with protrusion/hole means for detachably connecting the parts together, wherein the first part is retained onto the wiper blade and wherein the second part has an at least substantially U-shaped cross-section at the location of its connection to said first part, wherein each leg of said U-shaped cross-section is allowed to bend outwardly upon insertion of the oscillating arm into said second part for connecting said first and second parts together through a snapping operation.

Preferably, each leg of the U-shaped cross-section is bendable between a first position, wherein the first and second parts are connected together through a snapping operation upon insertion of the oscillating arm into the second part, and a second position, wherein the first and second parts are released from each other upon removing the oscillating arm from the second part. In other words, sliding the oscillating arm into the second part of the connecting device results in the legs of the U-shaped cross-section being bend outwardly. As a result the first and the second parts of the connecting device are automatically snapped, that is clipped onto each other, using the protrusion/hole means . Both parts are automatically released from each other by sliding the oscillating arm off the second part of the connecting device.

In one preferred embodiment of a windscreen wiper device in accordance with the invention the first part is provided with opposite abutting surfaces for abutting against the legs of the U-shaped cross-section, wherein a protrusion extends laterally outwardly from each leg of the U-shaped cross-section into a hole provided on an abutting surface abutting against a respective leg . In the alternative or in addition thereto, the first part is provided with opposite abutting surfaces for abutting against the legs of the U-shaped cross-section, wherein a protrusion extends laterally inwardly from each abutting surface into a hole provided on a leg abutting against a respective abutting surface.

In another preferred embodiment of a windscreen wiper device according to the invention the second part is positioned at least substantially within the first part.

In another preferred embodiment of a windscreen wiper device in accordance with the invention the first part comprises engaging members made integral therewith for engaging around the longitudinal sides of the longitudinal strips that face away from each other. In other words, the engaging members each form a groove for introducing the longitudinal strips therein, so that the first part of the connecting device is firmly retained onto the wiper blade. In order to enhance the retention thereof the engaging members may be welded, soldered, brazed or glued to the longitudinal strips.

In another preferred embodiment of a windscreen wiper device according to the invention the second part comprises at least one resilient tongue engaging in a correspondingly shaped hole provided in the oscillating arm, wherein the resilient tongue is rotatable along a hinge axis between an outward position retaining the wiper blade onto the oscillating arm and an inward position releasing the wiper blade from the oscillating arm. Particularly, the counterforce exerted by the oscillating arm on the resilient tongue engages at a point located behind the hinge axis, seen in the direction of the force exerted on the wiper blade. In other words, the moment of force ensures in a natural way that the resilient tongue is forced automatically in its outward position, that is its position retaining the wiper blade onto the oscillating arm.

In another preferred embodiment of a windscreen wiper device in accordance with the invention the hinge axis is located near an outer edge of the joint part.

In another preferred embodiment of a windscreen wiper device according to the invention the hole has a closed circumference . In the alternative, the hole has an open circumference.

In another preferred embodiment of a windscreen wiper device in accordance with the invention the windscreen wiper device is provided with first and second retaining means for retaining the connecting device onto the oscillating arm, wherein the first retaining means comprises the at least one resilient tongue engaging in the correspondingly shaped hole, and wherein the second retaining means comprise at least one protrusion provided on the first part engaging the oscillating arm. Particularly, the protrusion engages into a correspondingly shaped hole with a closed circumference provided on the oscillating arm. More in particular, the protrusion engages into a correspondingly shaped hole with an open circumference provided on a longitudinal side of the oscillating arm. Even more in particular, the protrusion engages into a correspondingly shaped recess provided on the oscillating arm.

THE DRAWINGS

The invention will now be explained in more detail with reference to figures illustrated in a drawing, wherein FIG. 1 is a perspective, schematic view of a preferred embodiment of a windscreen wiper device according to the invention;

Figure 2A:
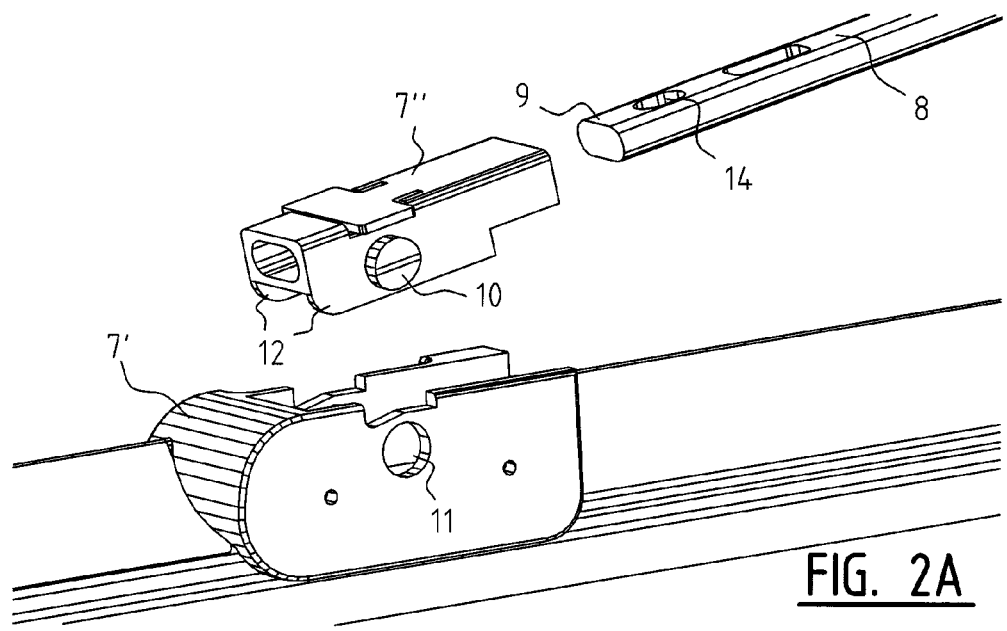
FIG. 2A-2C show various successive steps for fitting the connecting device and the oscillating arm of FIG. 1 together.
Figure 4:
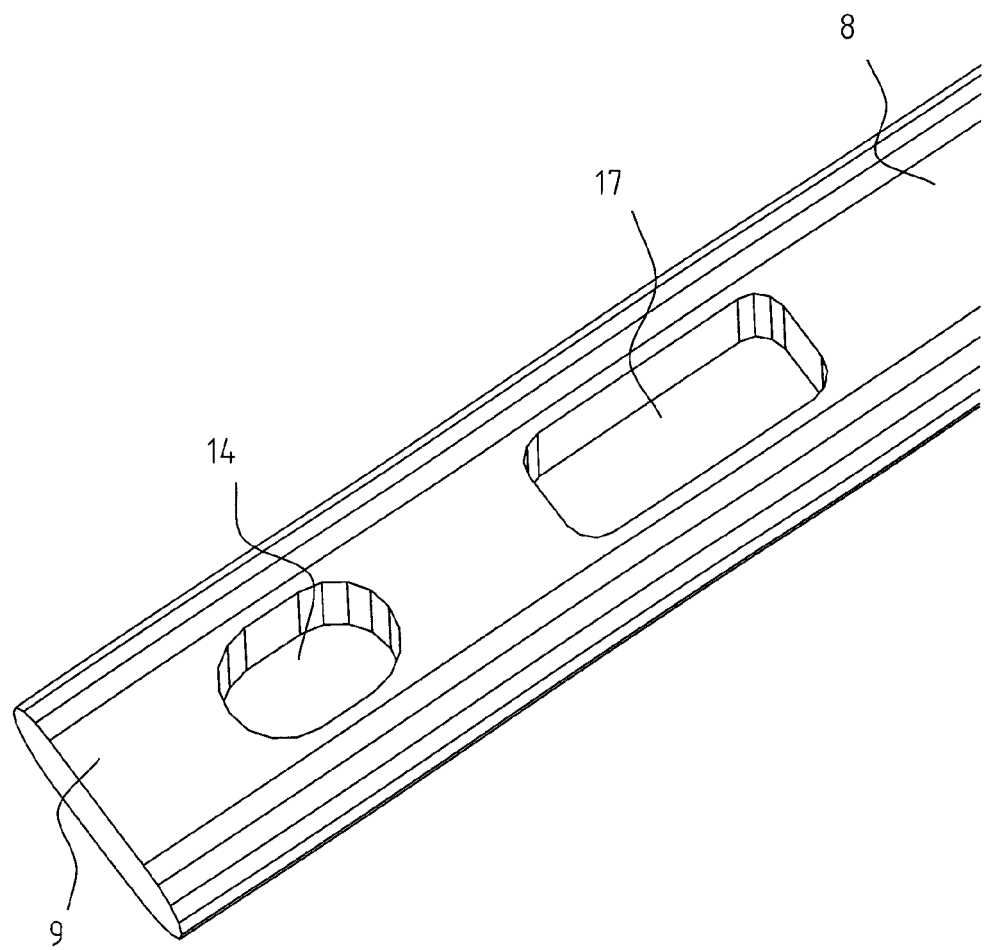
Figure 5A:
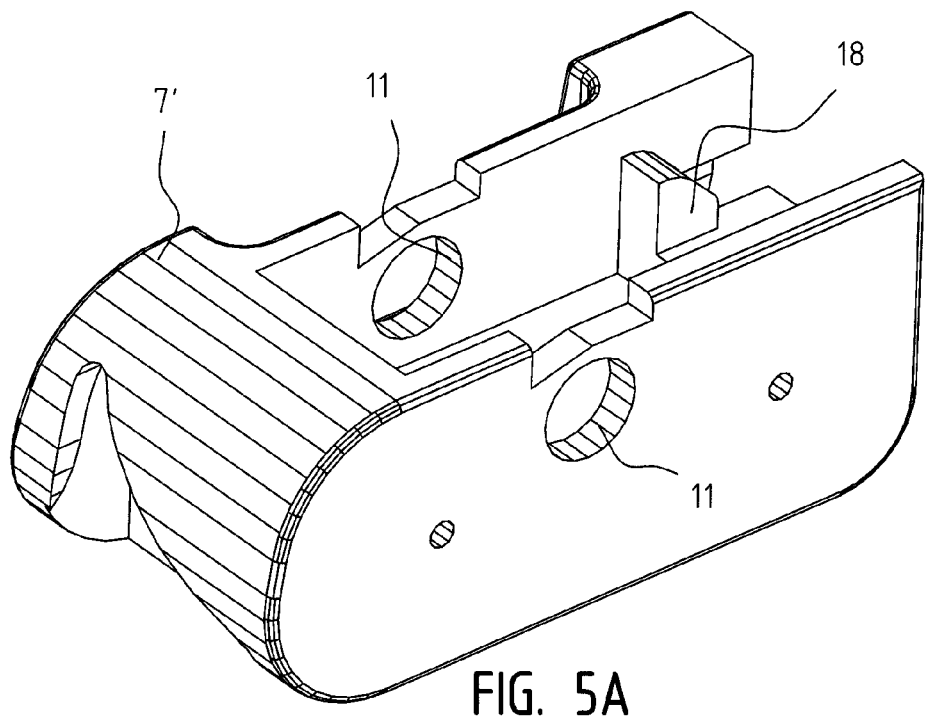
Figure 5B:
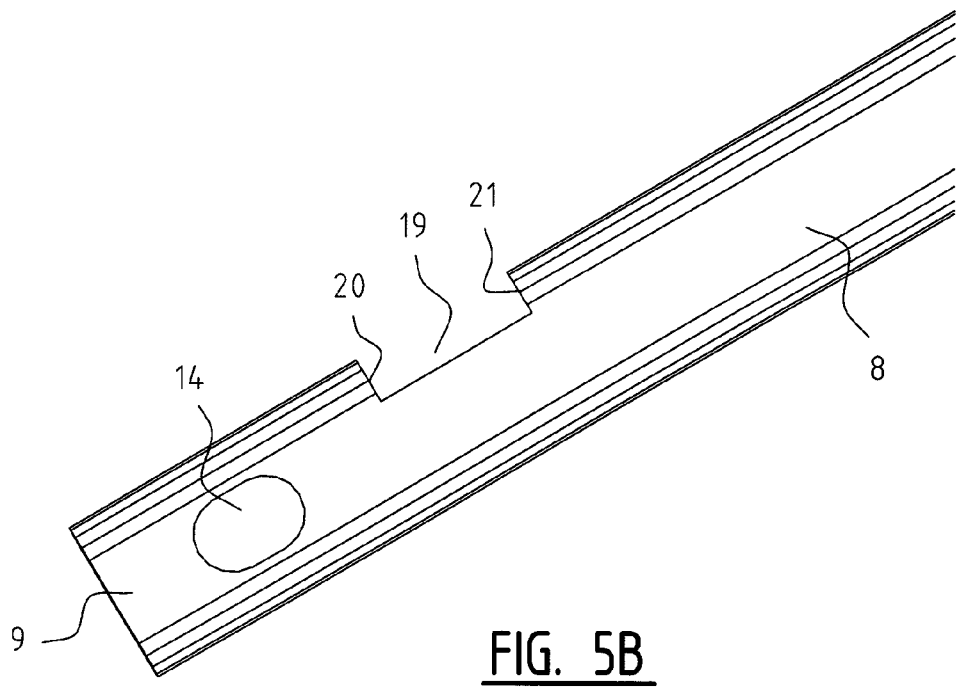
Figure 6A:
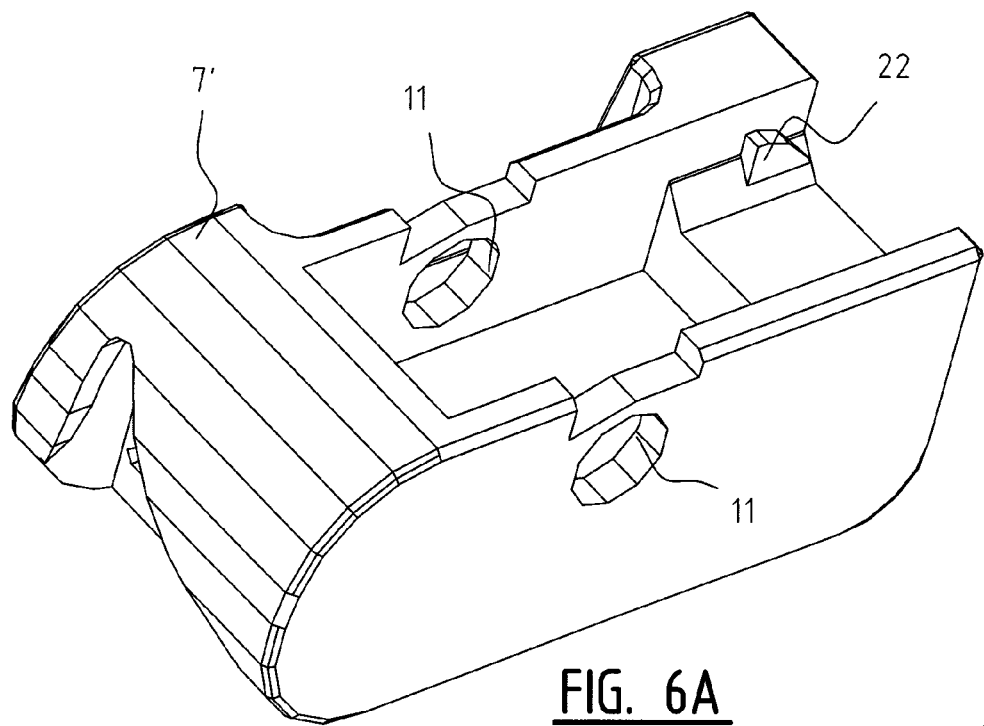
Figure 6B:
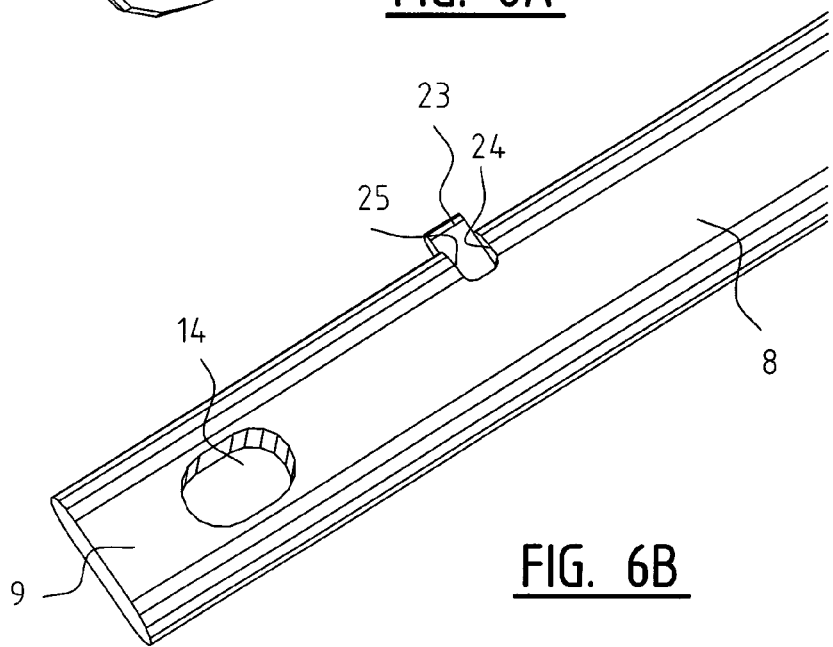

FIG. 4 refers to a perspective, schematic view of the free end of the oscillating arm of FIG. 2A;

FIG. 5A-5B show a perspective, schematic views of the first part of the connecting device and the free end of the oscillating arm in accordance with another preferred embodiment, seen from above, respectively; and FIG. 6A-6B is a perspective, schematic views of the first part of the connecting device and the free end of the oscillating arm in accordance with yet another preferred embodiment, seen from above, respectively.

DETAILED DESCRIPTION

Figure 1:
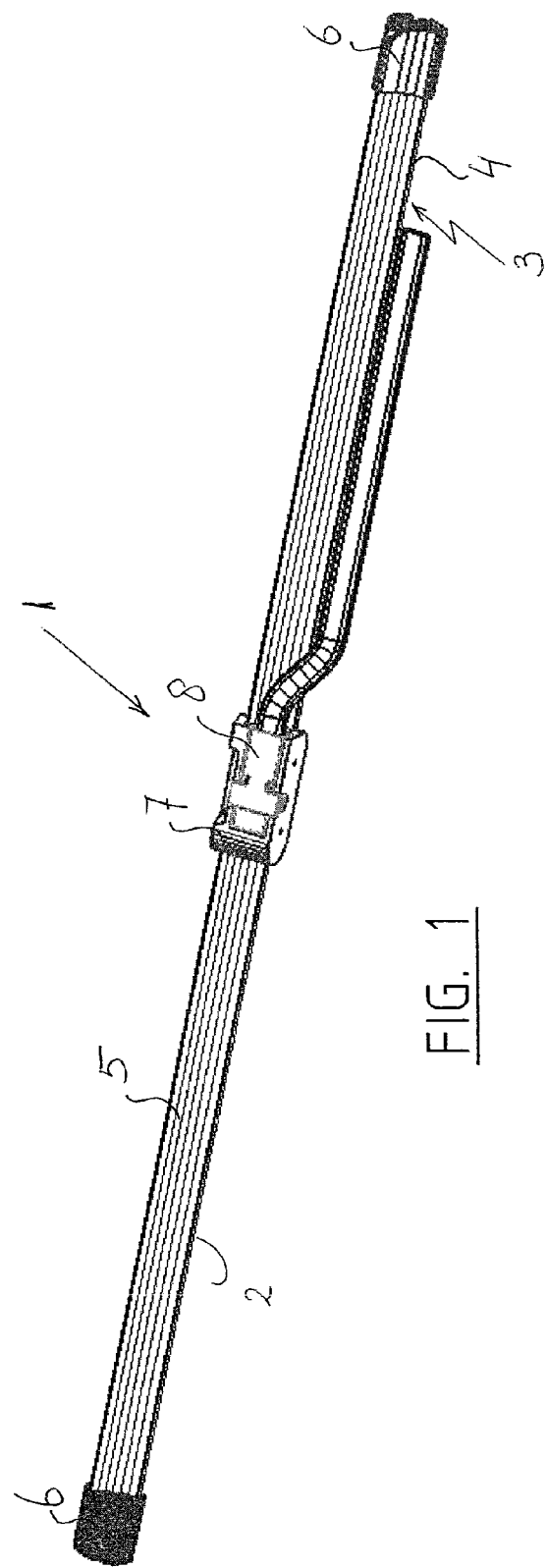

FIG. 1 shows a windscreen wiper device 1 of the "yokeless" type according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighboring ends of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends of strips 4. In another preferred variant, the connecting pieces 6 are in one piece with the strips 4 made of spring band steel. In the latter case the connecting pieces form transverse bridges for the strips 4, as it were. Possibly, a spoiler 5 is furthermore provided.

The windscreen wiper device 1 is furthermore built up of a connecting device 7 of plastic material for an oscillating wiper arm 8. The wiper arm 8 is finalized by an extension (without an adapter). Connecting device 7 consists of a first part 7' and a second part 7'" detachably connected together, wherein the first part 7" is retained onto the wiperblade 2 and wherein the second part 7'" is positioned within the first part 7'. The first part 7' has a U-shaped cross-section and comprises clamping members that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end, and that in the following manner.

Figure 2B:
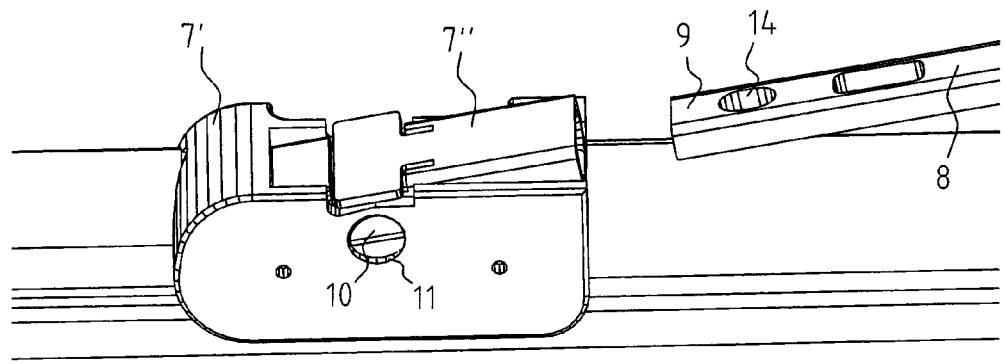
Figure 2C:
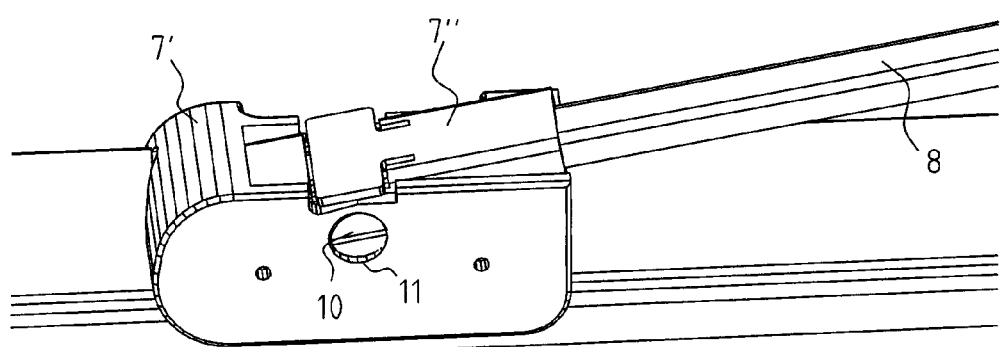

With reference to FIG. 2 the second part 7'" comprises two cylindrical protrusions 10 extending outwards on either side of the second part 7'" (FIG. 2a). These protrusions 10 pivotally engage in identically shaped cylindrical holes 11 of the part 7' (FIG. 2b). After the second part 7'" is placed into the first part 7' (with play) by hand, the free end 9 of the oscillating arm 8 is inserted into the second part 7'" (FIG. 2b). As a consequence thereof each leg 12 of the U-shaped cross-section of the second part 7'" is allowed to bend outwardly resulting in a click or snap connection between both parts 7' and 7'" (FIG. 2c). The protrusions 10 act as bearing surfaces at the location of a pivot axis in order to pivot the second part 7'" (and the oscillating wiper arm 8 attached thereto) about the pivot axis near one end 9 of the arm 8. The protrusions 10 are preferably in one piece with the second part 7'"; in the alternative, the protrusions 10 are part of a single pivot pin perpendicular to the connecting device 7. The connecting device 7 may be equipped with a cover or cap in order to obtain an aesthetic appearance thereof, to avoid sharp edges and to provide protection against UV-light etcetera.

Figure 3A:
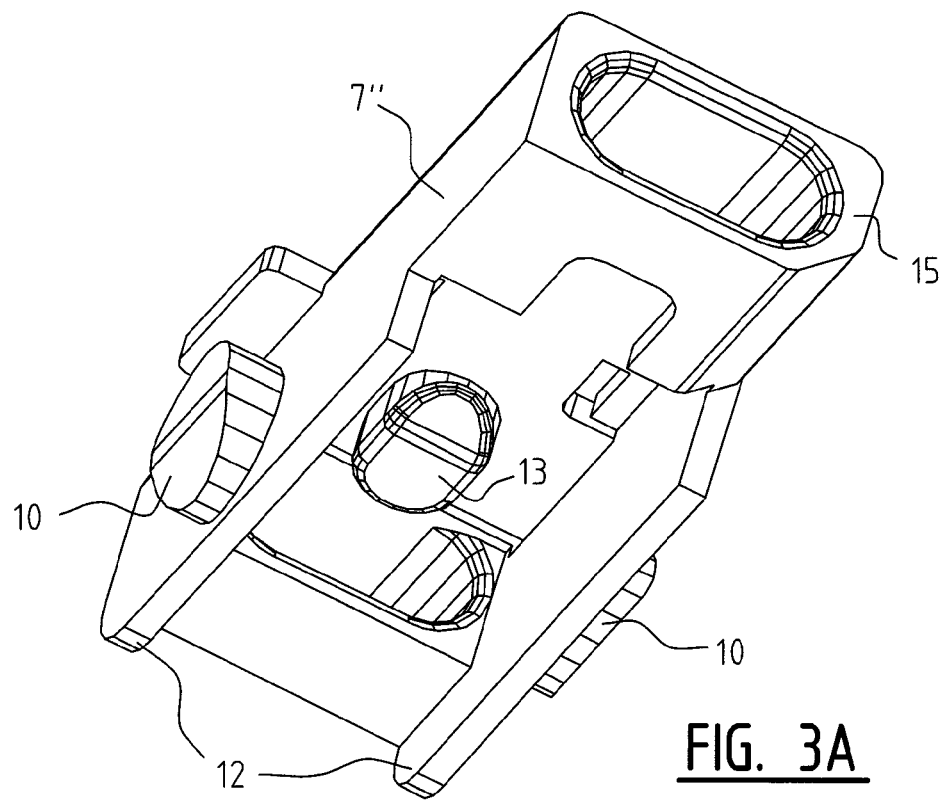
FIG. 3A-3B are perspective, schematic views of the first and the second parts of the connecting device of FIG. 2A, seen from beneath and from above, respectively.

Referring to FIGS. 3a and 4, the second part 7'" comprises a resilient tongue 13 extending inwardly, while the oscillating arm 8 has an identically shaped hole 14 with a closed circumference at the location of its connection to the second part 7'", so that the tongue 13 engages in the hole 14 (FIG. 4). While mounting the oscillating wiper arm 8 into the second part 7', the resilient tongue 13 is initially pushed out against a spring force and then allowed to spring back into the hole 14, thus snapping, that is clipping the resilient tongue 13 into the hole 14. This is a so-called bayonet-connection. As can be seen from FIG. 3a, the second part 7'" is provided with a channel-like section 15 for receiving the free end 9 of the oscillating arm 8.

Figure 3B:
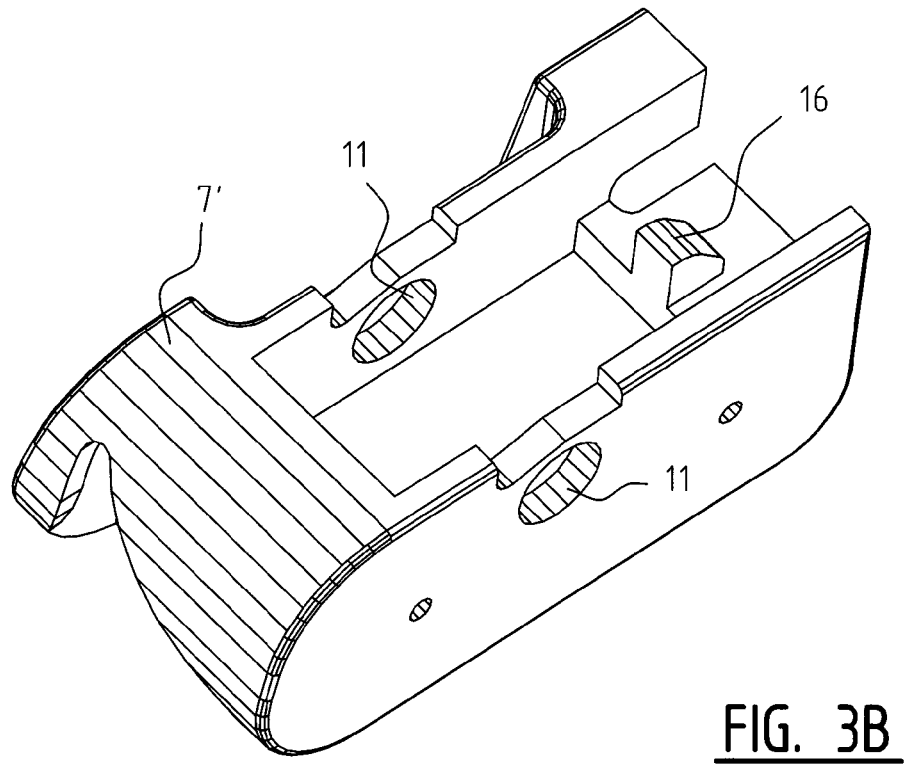

The resilient tongue 13 on the second part 7'" and the hole 14 in the oscillating arm 8 are meant for retaining the connecting device 7 onto the oscillating arm 8 and are therefore called "first retaining means". However, in case the first retaining means would dysfunction, for example when the resilient tongue 13 would not properly fit into the hole 14, the second part 7'" and the first part 7' connected thereto would be able to move relative to the oscillating arm 8 in longitudinal direction of the wiper blade 2. In order to avoid the wiper blade 2 from coming loose, with all negative consequences involved, second retaining means are provided for. The second retaining means consist of an upwardly extending protrusion 16 on said first part 7' cooperating with a second hole 17 having a closed circumference in the oscillating arm 8 (FIGS. 3b and 4). The protrusion 16 may also be called a cam.

FIGS. 5A and 5B refer to another preferred embodiment, wherein alternative second retaining means are shown in the sense that the first part 7' comprises an upwardly extending protrusion or cam 18 cooperating with a notch 19 at the location of a longitudinal edge of the oscillating arm 8. The notch 19 has opposite stop surfaces 20, 21 so that the protrusion 18 in assembled position is present between the stop surfaces 20, 21.

In FIGS. 6A and 6B yet another preferred embodiment is shown, wherein an upwardly extending protrusion or cam 22 on the first part 7' cooperates with a recess 23 at the location of a longitudinal edge of the oscillating arm 8. The recess 23 is provided with opposite stop surfaces 24, 25 for accommodating the protrusion 18 between these stop surfaces 24, 25 in assembled position.

For mounting or dismounting the connecting device 7 onto or from the oscillating arm 8, the second part 7'" and thus the free end 9 of the oscillating arm 8 connected thereto is pivoted relative to the first part 7' (FIGS. 2A through 2C). While carrying out the pivot movement the protrusion or cam 16,18, 22 is no longer in line with the hole 17,19 or the recess 23 and cannot mutually cooperate any longer, so that the second part 7'" and the first part 7' attached thereto can be released from the oscillating arm 8. This can, of course, only be done when also the resilient tongue 13 in all embodiments is released from the hole 14.

The invention is not restricted to the variants shown in the drawing, but it also extends to other embodiments that fall within the scope of protection.

The invention claimed is:

1. A windscreen wiper device comprising an elastic, elongated carrier element, an elongated wiper blade of a flexible material, which can be placed in abutment with a windscreen to be wiped and includes opposing longitudinal grooves on longitudinal sides thereof, in which grooves spaced-apart longitudinal strips of the carrier element are disposed, wherein neighboring ends of said longitudinal strips are interconnected by a respective connecting piece, which windscreen wiper device further comprises a connecting device for an oscillating arm, wherein said oscillating arm is pivotally connected to said connecting device about a pivot axis near one end, said connecting device including at least two parts provided with protrusion/hole means for detachably connecting said parts together, wherein said first part is retained onto said wiper blade and wherein said second part has an at least substantially U-shaped cross-section at the location of its connection to said first part, wherein each leg of said U-shaped cross-section is bent outwardly in response to insertion of said oscillating arm into said second part for connecting said first and second parts together through a snapping operation.

2. A windscreen wiper device according to claim 1, wherein each leg of said U-shaped cross-section is bendable between a first position, wherein said first and second parts are connected together through a snapping operation upon insertion of the oscillating arm into said second part, and a second position, wherein said first and second parts are released from each other upon removing the oscillating arm from said second part.

3. A windscreen wiper device according to claim 1, wherein said first part is provided with opposite abutting surfaces for abutting against the legs of the U-shaped cross-section, and wherein a protrusion extends laterally outwardly from each leg of the U-shaped cross-section into a hole provided on an abutting surface abutting against a respective leg.

4. A windscreen wiper device according to claim 1, wherein the second part is positioned at least substantially within said first part.

5. A windscreen wiper device according to claim 1, wherein said first part comprises engaging members made integral therewith for engaging around the longitudinal sides of the longitudinal strips that face away from each other.

6. A windscreen wiper device according to claim 1, wherein said second part comprises at least one resilient tongue engaging in a correspondingly shaped hole provided in the oscillating arm, and wherein said resilient tongue is rotatable along a hinge axis between an outward position retaining the wiper blade onto the oscillating arm and an inward position releasing the wiper blade from the oscillating arm.

7. A windscreen wiper device according to claim 6, wherein said resilient tongue is forced in the outward position under the influence of a moment in case a force is exerted on the wiper blade in a direction away from the oscillating arm.

8. A windscreen wiper device according to claim 7, wherein a counterforce exerted by the oscillating arm on the resilient tongue engages at a point located behind the hinge axis, seen in the direction of the force exerted on the wiper blade.

9. A windscreen wiper device according to claim 6, wherein said hole has a closed circumference.

10. A windscreen wiper device according to claim 1, wherein said windscreen wiper device is provided with first and second retaining means for retaining said connecting device onto said oscillating arm, wherein said first retaining means comprises said at least one resilient tongue engaging in a correspondingly shaped hole, and wherein said second retaining means comprise at least one protrusion provided on the first part engaging the oscillating arm.

11. A windscreen wiper device according to claim 10, wherein said protrusion engages into a correspondingly shaped hole with a closed circumference provided on the oscillating arm.

12. A windscreen wiper device according to claim 10, wherein said protrusion engages into a correspondingly shaped hole with an open circumference provided on a longitudinal side of the oscillating arm.

13. A windscreen wiper device according to claim 10, wherein said protrusion engages into a correspondingly shaped recess provided on the oscillating arm.

\* \* \* \* \*